US007698006B2

(12) United States Patent
Seo et al.

(10) Patent No.: US 7,698,006 B2
(45) Date of Patent: Apr. 13, 2010

(54) APPARATUS AND METHOD FOR ADAPTING AUDIO SIGNAL ACCORDING TO USER'S PREFERENCE

(75) Inventors: Jeong-Il Seo, Daejon (KR); Dae-Young Jang, Daejon (KR); Kyeong-Ok Kang, Daejon (KR); Jin-Woong Kim, Daejon (KR); Chie-Teuk Ahn, Daejon (KR)

(73) Assignee: Electronics and Telecommunications Research Institute (KR)

( * ) Notice: Subject to any disclaimer, the term of this patent is extended or adjusted under 35 U.S.C. 154(b) by 755 days.

(21) Appl. No.: 10/531,635

(22) PCT Filed: Oct. 15, 2003

(86) PCT No.: PCT/KR03/02148

§ 371 (c)(1),
(2), (4) Date: Nov. 3, 2005

(87) PCT Pub. No.: WO2004/036954

PCT Pub. Date: Apr. 29, 2004

(65) Prior Publication Data

US 2006/0233381 A1 Oct. 19, 2006

(30) Foreign Application Priority Data

Oct. 15, 2002 (KR) ...................... 10-2002-0062956
Oct. 14, 2003 (KR) ...................... 10-2003-0071344

(51) Int. Cl.
*G06F 17/00* (2006.01)
*G06F 15/16* (2006.01)

(52) U.S. Cl. ........................................ 700/94; 709/231

(58) Field of Classification Search .................. 700/94; 381/57, 61
See application file for complete search history.

(56) References Cited

U.S. PATENT DOCUMENTS

2002/0013812 A1* 1/2002 Krueger et al. .............. 709/203
2002/0120925 A1 8/2002 Logan
2003/0073411 A1 4/2003 Meade, II
2003/0156108 A1* 8/2003 Vetro ......................... 345/418
2005/0180578 A1* 8/2005 Cho et al. ..................... 381/56

FOREIGN PATENT DOCUMENTS

JP 6-215482 8/1994
JP 6-282281 10/1994

(Continued)

OTHER PUBLICATIONS

MPEG-21 Overview v.4, ISO/IEC JTC1/SC29/WG11/N4801, May 2002, 20 pages.*

(Continued)

*Primary Examiner*—Vivian Chin
*Assistant Examiner*—Joseph Saunders, Jr.
(74) *Attorney, Agent, or Firm*—Blakely, Sokoloff, Taylor & Zafman

(57) ABSTRACT

Apparatus and method for adapting audio signal according to user's preference. The apparatus and method allows the user to provide the best experience of digital contents by adapting audio contents to the user's sound field preference. The apparatus includes an audio usage environment management unit and an audio adaptation unit for adapting audio contents associated with user's adaptation request.

16 Claims, 4 Drawing Sheets

FOREIGN PATENT DOCUMENTS

| | | | |
|---|---|---|---|
| JP | 9-185383 | | 7/1997 |
| JP | 10-233058 | | 9/1998 |
| JP | 11-262100 | | 9/1999 |
| KR | 10-2003-0022842 | A | 3/2003 |
| KR | 1020030022838 | | 3/2003 |
| WO | WO 01/24462 | A1 | 4/2001 |
| WO | WO 01/24576 | A1 | 4/2001 |

OTHER PUBLICATIONS

Trivi, J.-M. Jot, J.-M.,Rendering MPEG-4 AABIFS content through a low-level cross-platform 3D audio API, Multimedia and Expo, 2002. ICME '02. Proceedings. 2002 IEEE Conference on Multimedia and Expo, vol. 1, Aug. 26-29, 2002, pp. 513-516.*

Rubak, Per; Johansen, Lars G., Design and Evaluation of Digital Filters Applied to Loudspeaker/Room Equalization, Paper No. 5172 AES Convention: 108 (Feb. 2000), pp. 1-19.*

Lokki, T. Savioja, L. Vaananen, R. Huopaniemi, J. Takala, T.; Creating interactive virtual auditory environments; Publication Date: Jul./Aug. 2002; This paper appears in: Computer Graphics and Applications, IEEE; vol. 22, Issue: 4 On pp. 49-57.*

Väänänen, Riitta; Synthetic Audio Tools in MPEG-4 Standard; Feb. 2000; presented at the 108th Convention; Paper No. 5080; pp. 1-25.*

International Organization for Standardization Organisation Internationale normalisation ISO/IEC JTC 1/SC29/WG 11 Coding of Moving Pictures and Audio-Information Technology-Multimedial Framework-Part 7: Digital Item Adaption 1, 24 pages, Jul. 2003.

Huopaniemi J et al., "Creating Interactive Virtual Auditory Environments," IEEE Computer Graphics and Applications, Jul. 1, 2002, pp. 49-57, vol. 22, IEEE Service Center, New York, NY US.

* cited by examiner

APPARATUS AND METHOD FOR ADAPTING AUDIO SIGNAL ACCORDING TO USER'S PREFERENCE

The present patent application is a non-provisional application of International Application No. PCT/KR03/02148, filed Oct. 15, 2003.

TECHNICAL FIELD

The present invention relates to an audio signal adaptation apparatus and a method thereof; and, more particularly, to an apparatus for adapting an audio signal to user's preference and a method thereof.

BACKGROUND ART

Moving Picture Experts Group (MPEG) has presented digital item adaptation (DIA), which is a new standard working item. A digital item (DI) means a structured digital object with a standard representation, identification and metadata, and DIA indicates a process for generating an adapted DI which is obtained after processed in a resource adaptation engine or descriptor adaptation engine.

Here, resource means an item that can be identified individually, such as video or audio, image or texture and the like. A descriptor means information related to an item or a component in the DI. Also, a user includes a producer, a rightful person, a distributor and a consumer all. Media resource stands for a content that can be expressed digitally immediately. Hereinafter, the word 'content' is used in the same meaning of DI, media resource and resource.

Conventional technologies have a problem that they cannot provide a single-source multi-use environment, in which one single audio content can be adapted to different usage environments by using information on the usage environment where the audio content is consumed, such as user characteristics, natural environment of a user, and capability of a user terminal.

"Single source" means one single content which is generated from a multimedia source, while "multi-use" means user terminals, each having a different usage environment, consume the "single source" adaptively to each usage environment.

An advantage of the single-source multi-use is that one content can be provided in diverse forms by reprocessing the content adaptively to different usage environments. Further, the single-source multi-use can make a network bandwidth decreased or used effectively when the single source adapted to the diverse usage environments is provided to user terminals.

Therefore, a content provider can reduce unnecessary cost that is generated when a plurality of contents are produced and transmitted to match audio signals with the diverse usage environments. A consumer of content also can overcome the spatial restriction of his/her environment and consume an optimal audio content that satisfies the hearing ability and preference of the content consumer.

However, the prior art does not make the best use of the advantage of using the single-source multi-use environment even in a universal multimedia access (UMA) environment.

That is, the multimedia source transmits an audio content indiscriminately with no consideration for usage environment, such as user characteristics, natural environment of a user, and the capability of a user terminal. Since the user terminal equipped with an audio player application, such as Windows Media Player, MP3 player, and Real Player, consumes the audio content whose form is as received from the multimedia source, it is not suitable for single-source multi-use environment.

To overcome the problems of the prior art and support the single-source multi-use environment, the multimedia source provides multimedia contents in consideration of various usage environment. However, this brings in much load in the generation and transmission of contents.

DISCLOSURE OF INVENTION

It is, therefore, an object of the present invention to provide an audio adaptation apparatus and a method for adapting an audio content suitably for usage environments by using information that describes the usage environments of user terminals.

Those of ordinary skill in the art of the present invention will easily understand the other objects and advantages of the present invention from the drawings, detailed description of the invention, and claims of this specification.

In accordance with one aspect of the present invention, there is provided an apparatus for adapting an audio signal for single-source multi-use, including: an audio usage environment information management unit for collecting, describing and managing audio usage environment information from each user terminal that consumes the audio signal; and an audio adaptation unit for adapting the audio signal so that the audio signal is outputted to the user terminal suitably to the audio usage environment information, wherein the audio usage environment information includes user characteristics information that describes sound field preference of the user for the audio signal.

In accordance with another aspect of the present invention, there is provided a method for adapting an audio signal for single-source multi-use, including the steps of: a) collecting, describing and managing audio usage environment information from each user terminal that consumes the audio signal; and b) adapting the audio signal so that the audio signal is outputted to the user terminal suitably to the audio usage environment information, wherein the audio usage environment information includes user characteristics information that describes sound field preference of the user for the audio signal.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Figure 1:
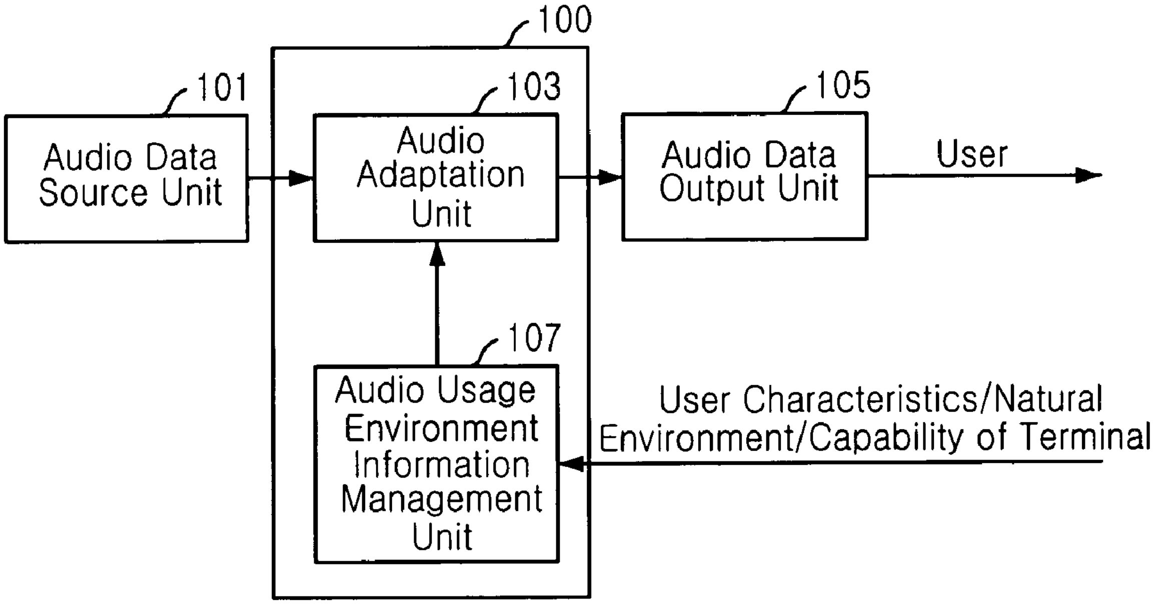
FIG. 1 is a block diagram showing an outline of a user terminal including an audio signal adaptation apparatus in accordance with an embodiment of the present invention.

Other objects and aspects of the invention will become apparent from the following description of the embodiments with reference to the accompanying drawings, which is set forth hereinafter.

Following description exemplifies only the principles of the present invention. Even if they are not described or illustrated clearly in the present specification, one of ordinary skill in the art can embody the principles of the present invention and invent various apparatuses within the concept and scope of the present invention.

The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Other objects and aspects of the invention will become apparent from the following description of the embodiments with reference to the accompanying drawings, which is set forth hereinafter. The same reference numeral is given to the same element, although the element appears in different drawings. In addition, if further detailed description on the related prior arts is determined to blur the point of the present invention, the description is omitted. Hereafter, preferred embodiments of the present invention will be described in detail with reference to the drawings.

FIG. 1 is a block diagram showing an outline of a user terminal including an audio signal adaptation apparatus in accordance with an embodiment of the present invention. The audio adaptation apparatus 100 includes an audio adaptation unit 103 and an audio usage environment information management unit 107. Each of the audio adaptation unit 103 and the audio usage environment information management unit 107 can be mounted on an audio processing system independently.

The audio processing system includes a laptop computer, a notebook computer, a desktop computer, a workstation, a mainframe computer or other types of computers. It also includes a data processing system or a signal processing system, such as personal digital assistant (PDA) and a mobile communication station.

The audio processing system may be one of the nodes that form a network path, e.g., a multimedia source node system, a multimedia relay node system, and an end user terminal. The end user terminal is equipped with an audio player, such as Windows Media Player, MP3 player and Real Player.

For example, when the audio adaptation apparatus 100 is mounted on the multimedia source node system and operated, the audio adaptation apparatus 100 receives usage environment information from the end user terminal, adapt a content to the usage environment, and transmit the adapted content to the end user terminal. That is, it adapts the content suitably to the usage environment by using information on the usage environment where the audio content is consumed.

The Technical Committee of the International Standard Organization (ISO)/International Electrotechnical Commission (IEC) describes the functions and operations of the elements shown in the preferred embodiment of the present invention in its Standards Document. Therefore, the Standards Document may be included as part of the present invention within the range that it helps understanding the technology of the present invention.

An audio data source unit 101 receives audio data generated from the multimedia source. The audio data source unit 101 can be included in a multimedia source node system, or a multimedia relay node system or an end user terminal that receives the audio data transmitted from the multimedia source node system through a wired/wireless network.

The audio adaptation unit 103 receives audio data from the audio data source unit 101. Then, an audio usage environment information management unit 107 adapts the audio data suitably to usage environment by using the usage environment information including information on user characteristics, natural environment of a user, and capability of user terminal.

Here, the function of the audio adaptation unit 103 is not necessarily included in any one node system, but it can be dispersed in another node system that forms a network path. For example, an audio adaptation unit 103 with a function of controlling audio volume, which is not related to a network bandwidth, is included in an end user terminal, whereas an audio adaptation unit 103 with a function related to the network bandwidth, for example, a function of controlling audio level, that is, the intensity of a particular audio signal in a time domain, can be included in a multimedia source node system.

The audio usage environment information management unit 107 collects information from a user, a user terminal and natural environment of the user, and then describes and manages usage environment information in advance.

Usage environment information related to a function performed by the audio adaptation unit 103 can be dispersed in a node system on the network path, just as the audio adaptation unit 103.

The audio data output unit 105 outputs audio data adapted by the audio adaptation unit 103. The outputted audio data can be transmitted to an audio player of an end user terminal, or transmitted to a multimedia relay node system or an end user terminal through a wired/wireless network.

Figure 2:
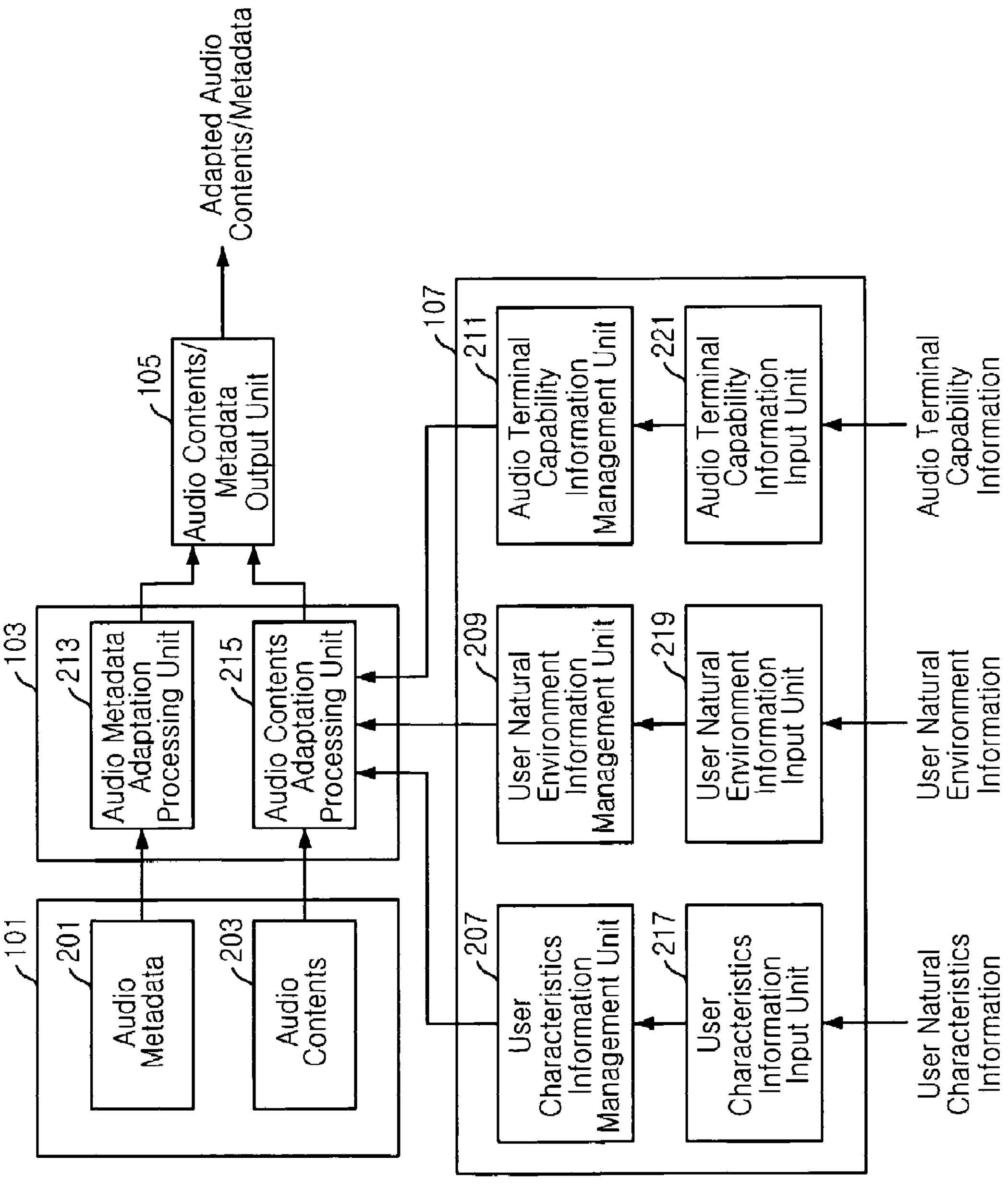
FIG. 2 is a block diagram illustrating an audio adaptation apparatus in accordance with an embodiment of the present invention.

FIG. 2 is a block diagram illustrating an audio adaptation apparatus in accordance with an embodiment of the present invention. Referring to FIG. 2, the audio data source unit 101 includes audio metadata 201 and audio contents 203.

The audio data source unit 101 collects and stores audio contents 203 and audio metadata 201 generated by a multimedia source. Here, the audio contents 203 can be stored in various different encoding methods, e.g., MP3, AC-3, AAC, WMA, RA, CELP and the like, or they include diverse audio formats transmitted in the form of streaming.

The audio metadata 201 are data related to an audio content, such as encoding method, sampling rate, the number of channels (e.g., mono, stereo, and 5.1 channel), and bit rate. They can be defined and described by extensible Markup Language (XML) schema.

The audio usage environment information management unit 107 includes: a user characteristics information management unit 207, a user characteristics information input unit 217, a user natural environment information management unit 209, a user natural environment information input unit 219, an audio terminal capability information management unit 211, and an audio terminal capability information input unit 221.

The user characteristics information management unit 207 receives user characteristics information from a user terminal and manages it. The user characteristics information includes characteristics of hearing ability, preferred audio volume, equalizing patterns on a preferred frequency spectrum and the like. In particular, the user characteristics information management unit 207 receives and manages information on a sound field preferred by the user. The inputted user characteristics information is managed in a language that can be readable mechanically, for example, a language of an XML form.

The user natural environment information management unit 209 receives information on natural environment where the audio content is consumed through the user natural environment information input unit 219 and manages the natural environment information. The inputted natural environment information is managed in a language that can be readable mechanically, for example, a language of an XML form.

The user natural environment information input unit 219 transmits noise environment characteristics information that can be defined by a noise environment classification table to the user natural environment information management unit 209. The noise environment classification table is predetermined or obtained by collecting data at a particular place and analyzing the data.

The audio terminal capability information management unit 211 receives audio terminal capability information through the audio terminal capability information input unit 221 and manages it. The inputted audio terminal capability information is managed in a language that can be readable mechanically, for example, a language of an XML form.

The audio terminal capability information input unit 221 can transmit audio terminal capability information, which is predetermined in the user terminal or inputted by the user, to the audio terminal capability information management unit 211.

The audio adaptation unit 103 can include an audio metadata adaptation processing unit 213 and an audio contents adaptation processing unit 215. The audio contents adaptation processing unit 215 parses the user natural environment information which is managed in the user natural environment information management unit 209 and performs transcoding so that the audio content could be adapted to the natural environment to thus survive the noise environment through audio signal processing, such as noise-masking.

Similarly, the audio contents adaptation processing unit 215 parses the user characteristics information and the audio terminal capability information that are managed in the user characteristics information management unit 217 and the audio terminal capability information management unit 211, respectively, and adapts audio signals so that the audio content could be suitable to the user characteristics and the audio terminal capability.

The audio metadata adaptation processing unit 213 provides metadata needed for the audio content adaptation process and adapts the content of audio metadata that correspond to the result of the audio content adaptation.

Figure 3:
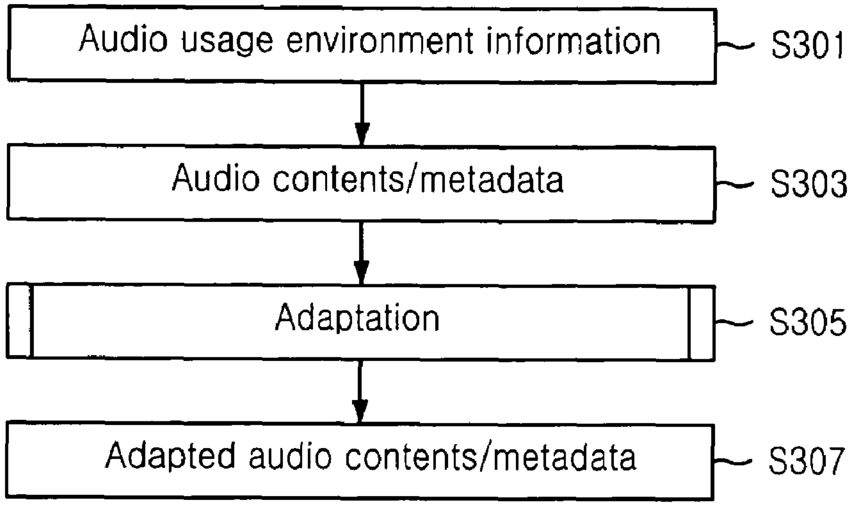
FIG. 3 is a flowchart describing an audio signal adaptation process performed in the audio signal adaptation apparatus of FIG. 1.

FIG. 3 is a flowchart describing an audio signal adaptation process performed in the audio signal adaptation apparatus of FIG. 1. Referring to FIG. 3, the process of the present invention starts with the audio usage environment information management unit 107.

At step S301, the audio usage environment information management unit 107 collets usage environment information of an audio content from the user, the mobile terminal and the natural environment and describes user characteristics information, user natural environment information and user terminal capability information in advance. At step S303, the audio data source unit 101 receives audio data.

Subsequently, at step S305, the audio adaptation unit 103 adapts the audio signals of the audio content, which are received at the step S303, suitably to the usage environment information, e.g., the user characteristics, the user natural environment and the user terminal capability by using the usage environment information described at the step S301. At step S307, the audio data output unit 105 outputs the audio data adapted at the step S305.

Figure 4:
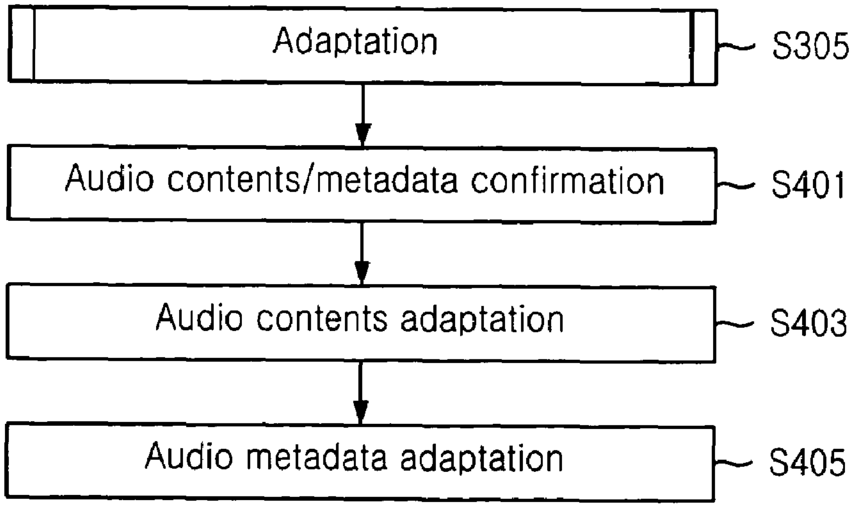
FIG. 4 is a flowchart illustrating the audio signal adaptation process of FIG. 3.

FIG. 4 is a flowchart illustrating the audio signal adaptation process of FIG. 3. Referring to FIG. 4, at step S401, the audio adaptation unit 103 checks the audio content and the audio metadata received by the audio data source unit 101. Then, at step S403, it adapts the audio data to be adapted suitably to the user characteristics, the user natural environment, and the user terminal capability.

Subsequently, at step S405, the audio adaptation unit 103 adapts the content of the audio metadata for the audio content based on the result of the audio content adaptation at the step S403. Hereinafter, an architecture of description information managed by the audio usage environment information management unit 107 will be described.

The information on the user characteristics, the user terminal capability and the characteristics of the natural environment should be managed in order to adapt the audio content suitably to the usage environment, where the audio content is consumed, by using usage environment information which is described in advance, such as the user characteristics, the user natural environment and the user terminal capability.

Particularly, the user characteristics information includes "AudioPresentationPreference" descriptors that describe the audio presentation preference of the user. The "AudioPresentationPreference" descriptors that have been discussed in the Moving Picture Experts Group 21 (MPEG-21) are "AudioPower", "Mute", "FrequencyEqualizer", "Period", "Level", "PresetEqualizer", "AudioFrequencyRange", and "AudibleLevelRange" descriptors.

The "AudioPower" descriptor shows a user's preference for loudness of audio. It is described on a normalized percentage scale from 0 to 1. The "Mute" descriptor shows the user's preference for the mute part of the audio in a digital device.

The "FrequencyEqualizer" descriptor shows the user's preference for the unique concept of equalization using a frequency domain and a decay value. The "Period" descriptor is a feature of the "FrequencyEqualizer" descriptor and it defines the lower corner frequency and the upper corner frequency of an equalization range that is expressed in hertz (Hz).

The "Level" descriptor is a feature of the "FrequencyEqualizer" descriptor and it defines amplification and decay values of a frequency range that is expressed in decibel (dB) on a scale of from −15 to 15.

The "PresetEqualizer" descriptor indicates the user's preference for the unique concept of equalization through a linguistic technology of an equalizer preset. The preset is presented as jazz, rock, classical music and pop music. The "AudioFrequencyRange" descriptor shows the user's preference for a particular frequency area. It is expressed in hertz (Hz) from the lower corner frequency to the upper corner frequency.

The "AudibleLevelRange" descriptor describes the user's preference for a particular level range. The highest value and the lowest value are given 1 and 0 respectively.

Meanwhile, the "AudioPresentationPreference" descriptors cannot describe the user's preference for sound field sufficiently. Therefore, a descriptor that can describe user preference information for a sound field is needed. So, the present invention suggests describing the preference for sound field at a particular place with an impulse response and perceptual parameters.

For example, a sound field such as a hall or a church can be expressed by obtaining impulse response of a corresponding place with one or more microphones and convoluting the obtained impulse response with a corresponding audio content.

Figure 5:
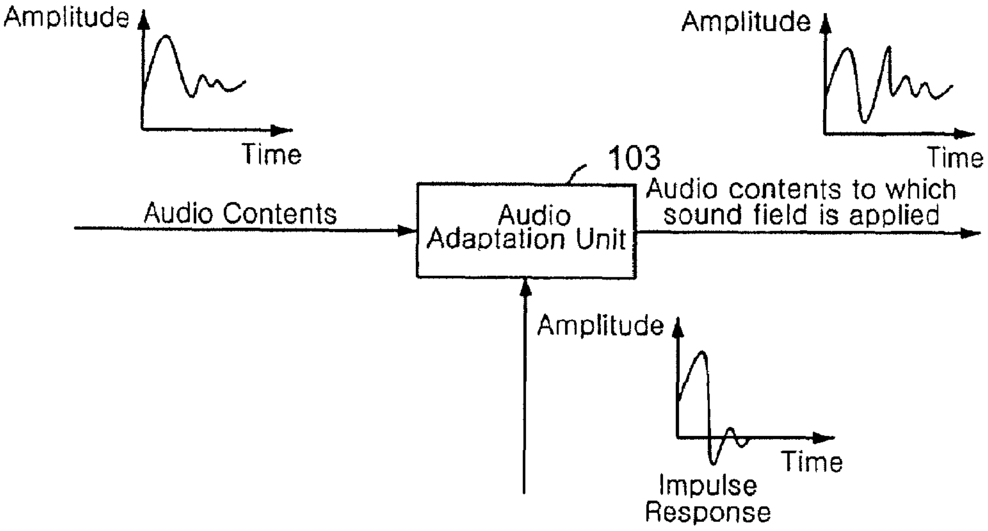
FIG. 5 is a diagram showing that sound field characteristics preferred by a user are embodied through convolution of an audio content and an impulse response.

FIG. 5 is a diagram showing that sound field characteristics preferred by a user are embodied through a convolution of an audio content and an impulse response. Referring to FIG. 5, the audio adaptation unit 103 convolutes the impulse response and the audio content so that the audio content could reflect the sound field characteristics of the user.

The use of the impulse response makes it possible to describe the sound field of a consumed content most precisely, and the perceptual parameters express the feeling of audio signals perceived by the user, such as sound source warmth and heaviness of sound.

Following is an architecture of technical information of usage environment managed by the audio usage environment information management unit 107 of FIG. 1. It shows an exemplary syntax expressing a sound field preferred by a user based on the definition of an XML schema.

```
<element name="SoundFieldGenerator">
<sequence>
<element name="ImpulseResponse" minOccurs="0">
<complexType>
<sequence maxOccurs="unbounded">
```

-continued

```
<element name="time" type="float"/>
<element name="amplitude" type="float"/>
</sequence>
</complexType>
</element>
<element name="PerceptualParameters" minOccurs="0">
<sequence>
<element name="SourcePresence" type="float"/>
<element name="SourceWarmth" type="float"/>
<element name="SourceBrilliance" type="float"/>
<element name="RoomPresence" type="float"/>
<element name="RunningReverberance" type="float"/>
<element name="Envelopment" type="float"/>
<element name="LateReverberance" type="float"/>
<element name="Heavyness" type="float"/>
<element name="Liveness" type="float"/>
<element name="RefDistance" type="float"/>
<element name="FreqLow" type="float"/>
<element name="FreqHigh" type="float"/>
<element name="Timelimit1" type="float"/>
<element name="Timelimit2" type="float"/>
<element name="Timelimit3" type="float"/>
</element>
```

The descriptors of "ImpulseResponse" and the descriptors of "Perceptural Parameters" describe an impulse response and perceptual parameters, respectively. The audio adaptation unit 103 adapts the audio data suitably to the sound field characteristics preferred by the user based on the descriptors of the "ImpulseResponse" and the descriptors of the "Perceptural Parameters".

As shown in the above XML code, an impulse response can be expressed with a successive time value and an amplitude value. On the other hand, it is possible to replace the impulse response with a Uniform Resource Identifier (URI) address having impulse response characteristic information by considering the amount of data of the "ImpulseResponse".

Also, the user's preference for a sound field can be reflected by adding additional descriptors, such as "SamplingFrequency", "BitsPerSample" and "NumOfChannel" descriptors, along with the impulse response characteristics obtained from the URI address. The perceptual parameters use "PerceptualParameters" descriptors of MPEG-4 Advanced AudioBIFS to describe a scene preferred by the user. For more description on each descriptor, "ISO/IEC 14496-1:1999" can be referred to.

As shown in the above XML code, the "PerceptualParameters" includes: "SourcePresence", "SourceWarmth", "SourceBrilliance", "RoomPresence", "RunningReverberance", "Envelopment", "LateReverberance", "Heavyness", "Liveness", "RefDistance", "FreqLow", "FreqHigh", "Timelimit1", "Timelimit2", and "Timelimit3" descriptors.

Figure 6:
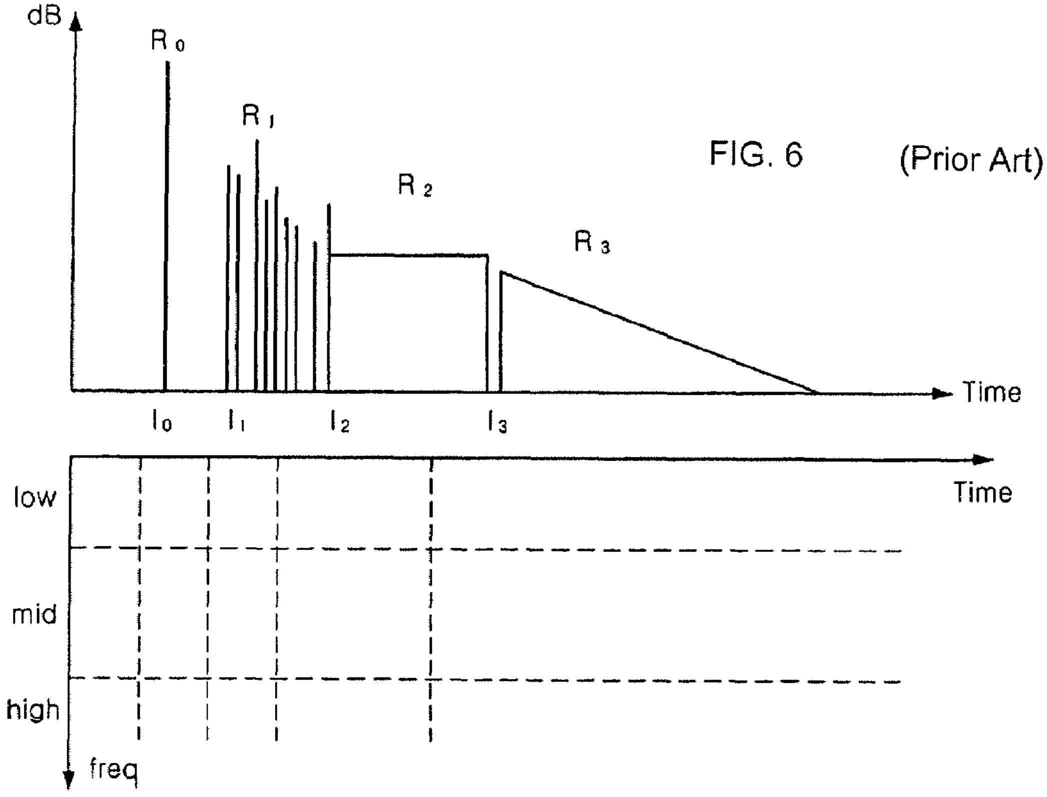
FIG. 6 (Prior Art)
FIG. 6 is a graph describing the descriptors of perception parameters.

FIG. 6 is a graph describing the descriptors of "PerceptionParameters". The "SourcePresence" descriptor describes direct sound and the energy of early room effect in decibel. The "SourceWarmth" descriptor describes the relative early energy at a low frequency in decibel.

The "SourceBrilliance" descriptor describes the relative early energy at a high frequency in decibel. The "RoomPresence" descriptor describes the energy of later room effect in decibel.

The "RunningReverberance" descriptor describes the relative early decay time in millisecond (ms). The "Envelopment" descriptor describes the energy of early room effect related to the direct sound in decibel.

The "LateReverberance" descriptor describes late decay time in millisecond (ms). The "Heavyness" descriptor describes relative decay time at a low frequency. The "Liveness" descriptor describes relative decay time at a high frequency.

The "RefDistance" descriptor describes a reference distance that defines the perceptual parameters in meter (m). The "FreqLow" descriptor describes the limitation of a low frequency in hertz (Hz), as shown in FIG. 6. The "FreqHigh" descriptor describes the limitation of a high frequency in hertz (Hz), as shown in FIG. 6.

The "Timelimit1" descriptor describes the limitation $(l_1)$ of a first moment in millisecond (ms), as shown in FIG. 6. The "Timelimit2" descriptor describes the limitation $(l_2)$ of a second moment in millisecond (ms), as shown in FIG. 6. The "Timelimit3" descriptor describes the limitation $(l_3)$ of a third moment in millisecond (ms), as shown in FIG. 6.

Just as the impulse response, the audio adaptation unit 103 reflects the sound field characteristics preferred by the user in the audio content based on the perceptual parameters.

Further to the impulse response characteristics and the perceptual parameters, an "AuditoriumParameters" descriptor can be added to obtain three-dimensional sound.

The space where a content is consumed can be different according to users, even if the sound field characteristics preferred by users are the same. So, the restored content can have different sound field characteristics. Therefore, the audio adaptation unit 103 removes adverse effects caused by user sound environment based on the "AuditoriumParameters" descriptor.

Following is an architecture of technical information of a usage environment which is managed by the audio usage environment information management unit 107 of FIG. 1. It shows an exemplary syntax expressing the user sound environment based on XML schema definition.

```
<element name="AuditoriumParameters" minOccurs="0">
<sequence>
<element name="ReverberationTime" type="float"
minOccurs="0"/>
<element name="InitialDecayTime" type="float"
minOccurs="0"/>
<element name="RDRatio" type="float" minOccurs="0"/>
<element name="Clarity" type="float" minOccurs="0"/>
<element name="IACC" type="float" minOccurs="0"/>
</sequence>
</element>
```

The "AuditoriumParameters" uses "ReverberationTime", "InitialDecayTime", "RDRatio", "Clarity", and "IACC" descriptors to express the sound environment of a space where the user consumes the audio content.

The "ReverberationTime" descriptor expresses reverberation time. It describes the time taken for decaying a sound level by 60 dB in millisecond. The reverberation time is expressed as RT or T60 and it is the most basic physical quantity that shows interior sound characteristics.

The "InitialDecayTime" descriptor expresses the initial decay time. It describes the time difference between the direct sound and the reflected sound in millisecond. The initial decay time is a physical quantity that shows the intimacy with a hall. It is also called IDT.

The "RDRatio" descriptor describes the energy ratio of the direct sound and a reflected sound after 50 milliseconds in per cent (%). The "RDRatio" descriptor is an information quantity that expresses a single sound and a wave form of the reverberation sound. It is a physical quantity that indicates clarity of a picture and it is called D50.

The "clarity" descriptor describes the energy ratio of the direct sound and a reflected sound after 80 milliseconds in per cent (%). It is a basic physical quantity that indicates the clarity of music and it is called C80.

The "IACC" descriptor describes the maximum value that is obtained when an internal crosscorrelation function of an impulse response obtained at the left ear and the right ear is acquired in a range of from −1 ms to 1 ms. The "IACC" descriptor is described in a range of from −1 to 1. The "IACC" descriptor shows similarity of sound that arrives at each ear of the listener. It is a physical quantity that indicates the sense of spread of the sound.

The above descriptors represent the characteristics of the sound environment of the user. In accordance with the present invention, it is possible to provide a single-source multi-use environment where one audio content can be adapted suitably to the characteristics and tastes of various users in different usage environment by using sound field information preferred by the users and the user sound environment information.

While the present invention has been described with respect to certain preferred embodiments, it will be apparent to those skilled in the art that various changes and modifications may be made without departing from the scope of the invention as defined in the following claims.

What is claimed is:

1. An apparatus for adapting an audio signal, comprising:

an audio usage environment information management means for collecting, describing and managing audio usage environment information related to consuming the audio signal; and an audio adaptation means for adapting the audio signal to the audio usage environment information, wherein the audio adaptation means adapts the audio signal by changing sound field characteristics of the audio signal based on impulse response preference information of the user, wherein the audio usage environment information includes user characteristics information, the user characteristics information includes the impulse response preference information that uses an impulse response to describe a sound field preference of the user for the audio signal, the user characteristics information further includes sampling frequency preference information, bits per sample preference information, and number of channels preference information of the impulse response, and wherein the impulse response preference information is provided by an element of an extensible Markup Language (XML) schema, the element including a Uniform Resource Identifier (URI) address from which data of the impulse response is obtained.

2. The apparatus as recited in claim 1, wherein the audio adaptation means transmits an adapted audio signal to a user terminal.

3. The apparatus as recited in claim 1, wherein the user characteristics information includes perceptual parameters preference information describing the sound field preference of the user by perceptual parameters, and the audio adaptation means adapts the audio signal and transmits the adapted audio signal to the user terminal by changing the sound field characteristics of the audio signal based on the perceptual parameters preference information.

4. The apparatus as recited in claim 3, wherein the perceptual parameters preference information includes information describing direct sound, energy of early room effect, and relative early energy at a low and high frequency.

5. The apparatus as recited in claim 3, wherein the perceptual parameters preference information includes energy of later room effect and relative early decay time.

6. The apparatus as recited in claim 3, wherein the perceptual parameters preference information includes energy of early room effect related to the direct sound and late decay time.

7. The apparatus as recited in claim 3, wherein the perceptual parameters preference information includes relative decay time at a low and high frequency and a reference distance that defines the perceptual parameters.

8. The apparatus as recited in claim 3, wherein the perceptual parameters preference information includes limitation of a low and high frequency and time limitation.

9. A method for adapting an audio signal, comprising the steps of:

a) collecting and managing audio usage environment information related to consuming the audio signal; and b) adapting the audio signal to the audio usage environment information, wherein adapting the audio signal further comprises:

changing sound field characteristics of the audio signal based on impulse response preference information of the user, wherein the audio usage environment information includes user characteristics information, the user characteristics information includes the impulse response preference information that uses an impulse response to describe a sound field preference of the user for the audio signal, wherein the user characteristics information further includes sampling frequency preference information, bits per sample preference information, and number of channels preference information of the impulse response, and wherein the impulse response preference information is provided by an element of an extensible Markup Language (XML) schema, the element including a Uniform Resource Identifier (URI) address from which data of the impulse response is obtained.

10. The method as recited in claim 9, wherein adapting the audio signal further comprises transmitting an adapted audio signal to a user terminal.

11. The method as recited in claim 9, wherein the user characteristics information includes perceptual parameters preference information describing the sound field preference of the user by perceptual parameters and, at the step b), the audio signal is adapted and transmitted to the user terminal by changing the sound field characteristics of the audio signal based on the perceptual parameters preference information.

12. The method as recited in claim 11, wherein the perceptual parameters preference information includes information describing direct sound, energy of early room effect, and relative early energy at a low and high frequency.

13. The method as recited in claim 11, wherein the perceptual parameters preference information includes energy of later room effect and relative early decay time.

14. The method as recited in claim 11, wherein the perceptual parameters preference information includes energy of early room effect related to the direct sound and late decay time.

15. The method as recited in claim 11, wherein the perceptual parameters preference information includes relative decay time at a low and high frequency and a reference distance that defines the perceptual parameters.

16. The method as recited in claim 11, wherein the perceptual parameters preference information includes limitation of a low and high frequency and time limitation.

* * * * *